(12) United States Patent
Jin et al.

(10) Patent No.: US 8,238,880 B2
(45) Date of Patent: Aug. 7, 2012

(54) METHOD AND APPARATUS FOR PROCESSING AUTHENTICATION OF MOBILE TERMINAL

(75) Inventors: Chongting Jin, Shenzhen (CN); Zhengrong Liu, Shenzhen (CN); Qicheng Guo, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/096,192

(22) Filed: Apr. 28, 2011

(65) Prior Publication Data

US 2011/0201309 A1 Aug. 18, 2011

Related U.S. Application Data

(63) Continuation of application No. PCT/CN2008/072891, filed on Oct. 31, 2008.

(51) Int. Cl.
*H04W 12/06* (2009.01)
*G06T 7/00* (2006.01)
*G06K 9/22* (2006.01)

(52) U.S. Cl. ........ 455/411; 455/410; 340/5.83; 382/118
(58) Field of Classification Search ........... 455/410–411
See application file for complete search history.

(56) References Cited

U.S. PATENT DOCUMENTS

| | | | | |
|---|---|---|---|---|
| 7,130,454 B1 * | 10/2006 | Berube et al. | ................. | 382/118 |
| 2006/0104483 A1 * | 5/2006 | Harel et al. | .................. | 340/5.82 |
| 2006/0285663 A1 * | 12/2006 | Rathus et al. | ............. | 379/88.22 |
| 2007/0009139 A1 * | 1/2007 | Landschaft et al. | .......... | 382/115 |
| 2007/0120948 A1 * | 5/2007 | Fujioka et al. | ............. | 348/14.01 |
| 2007/0198286 A1 * | 8/2007 | Tomita | ............................... | 705/1 |
| 2009/0042540 A1 * | 2/2009 | Bodnar et al. | ................. | 455/410 |
| 2009/0141950 A1 * | 6/2009 | Ryu | ............................... | 382/118 |

FOREIGN PATENT DOCUMENTS

JP 2005-346388 A 12/2005

* cited by examiner

*Primary Examiner* — Jean Gelin
*Assistant Examiner* — Tangela T. Chambers
(74) *Attorney, Agent, or Firm* — Christopher P. Maiorana, PC

(57) ABSTRACT

The present invention discloses a method and an apparatus for processing an authentication of a mobile terminal, wherein the method includes: a network side receiving an image identity message from a mobile terminal, wherein the image identity message carries current image feature information and a user identifier of the mobile terminal; and searching image feature information which is saved previously in a database by the user identifier of the mobile terminal, performing a corresponding algorithm match between the current image feature information and the image feature information according to a preset security level, and performing an authentication on the mobile terminal based on the result of the match. By means of the technical solution of the present invention applying, the image information collected by photo shooting is used as an identity identification password, therefore, the identity authentications of different security levels can be provided, and the security and the expansibility of the identity authentication of the mobile terminal is increased greatly.

12 Claims, 5 Drawing Sheets

METHOD AND APPARATUS FOR PROCESSING AUTHENTICATION OF MOBILE TERMINAL

This is a continuation of International Application PCT/CN/2008/072891, with an International Filing Date of Oct. 31, 2008, which is incorporated by reference.

FIELD OF THE INVENTION

The present invention relates to communication field, and in particular to a method and an apparatus for processing an authentication of a mobile terminal.

BACKGROUND OF THE INVENTION

With the development of the mobile communication technology, especially the rapid development of smartphones, a mobile terminal has more and more functional services, for instance, a multimedia entertainment, a mobile office, an information management, a mobile shopping, etc. Meanwhile, as the function of accessing the internet by a mobile phone is constantly perfected and the intelligent open platform is popularized, the mobile phone has gradually become an integrated platform for managing personal information.

Since the security of the mobile phone has been closely associated with an information security, an economic property safety, a personal privacy of a user and etc., a traditional identity authentication of the mobile phone is to encrypt text information, the amount of information is quite limited, and once the mobile phone is lost, it will bring a huge loss to the user, with the security very low.

SUMMARY OF THE INVENTION

The present invention is proposed considering the problem of the low security of the mobile terminal existed in the related art. Therefore, the main objective of the present invention is to provide a method and an apparatus for processing an authentication of a mobile terminal, so as to solve the above problem.

According to one aspect of the present invention, a method for processing an authentication of a mobile terminal is provided.

The method for processing an authentication of a mobile terminal according to the present invention includes: receiving an image identity message from a mobile terminal, wherein the image identity message carries current image feature information and a user identifier of the mobile terminal; and searching image feature information which is saved previously in a database by the user identifier of the mobile terminal and performing a match between the current image feature information and the saved image feature information according to an algorithm of the preset security level, and performing an authentication on the mobile terminal based on the result of the match.

In the above, before receiving the image identity message from the mobile terminal, the method further comprises: for each mobile terminal, presetting corresponding relations among the owner's user identifier, his image feature information and his security level thereof.

In the above, before receiving the image identity message from the mobile terminal, the method further comprises: the mobile terminal obtaining an image by an image shooting device thereon, and obtaining the current image feature information according to the image.

Preferably, the image identity message further comprises a security level requested by the mobile terminal, correspondingly, the above method further includes: comparing the security level requested by the mobile terminal with the security level preset in the database; and authorizing to the mobile terminal a running mode of the mobile terminal corresponding to the security level requested in the case that the security level requested is lower than or equal to the preset security level.

In the above, an operation of performing the authentication on the mobile terminal according to the result of the match specifically comprises: obtaining an authorization result according to the result of the match, wherein the authorization result comprises the mobile terminal passing the authentication or the mobile terminal failing to pass the authentication; and configuring an authentication and authorization data packet according to the authorization result, and returning the same to the mobile terminal.

Preferably, the method further includes: the mobile terminal receiving the authentication data packet, and judging whether it passes the authentication according to the authorization data packet; wherein if the result of the judgment is "pass", the mobile terminal enters a running mode corresponding to the security level requested; and if the result of the judgment is "fail" or the mobile terminal fails to receive the authorization data packet in a predetermined period of time after sending the image identity message, the mobile terminal enters a restricted mode.

In the above, the user identifier of the above mobile terminal comprises one of the following: an international mobile subscriber identity, a PS-NUMBER, and a Mobile Identification Number.

According to another aspect of the present invention, an apparatus for processing an authentication of a mobile terminal is provided.

The apparatus for processing an authentication of a mobile terminal according to the present invention comprises: receiving means, configured to receive an image identity message from a mobile terminal, wherein the image identity message carries current image feature information and a user identifier of the mobile terminal; searching means, configured to search image feature information which is saved previously and in the corresponding relation with the user identifier of the mobile terminal; matching means, configured to perform a corresponding algorithm match between the current image feature information and the image feature information according to a preset security level; and authentication processing means, configured to perform an authentication on the mobile terminal based on a result of the match determined by the algorithm match.

Further, the above apparatus further comprises: setting means, configured to set corresponding relations among the user identifier, the image feature information and the security level of each mobile terminal.

By means of at least one technical solution above of the present invention, the image information collected by photo shooting is used as an identity identification password, therefore, the identity authentications of different security levels can be provided, and the security and the expansibility of the identity authentication of the mobile terminal is increased greatly.

DESCRIPTION OF THE ACCOMPANYING DRAWINGS

The accompanying drawings provide a further understanding of the present invention, and form a part of the Description. The embodiments of the present invention and the accompanying drawings are used to explain the present invention without limiting the present invention, wherein.

DETAILED DESCRIPTION OF EMBODIMENTS

Function Overview

With respect to the above problems, the present invention provides a method of performing, by camera picture(s), a security authentication to a mobile terminal, so as to control the switch-on of the mobile terminal, and mainly relates to how the mobile terminal having a camera performs the image identity authentication of different security levels to access a system. The main spirit of the present invention is: the mobile terminal entering a restricted mode after switch-on, prompting the user to perform the identity authentication, collecting identity associated image(s) by the camera means in the cellphone, i.e., taking picture(s) by the camera, extracting feature information from the image(s), constructing the feature information and the user identifier into a Picture ID Package, encrypting and compressing the package, sending, via a wireless network side, the package to an identity authentication server to perform an identity authentication, and determining a corresponding security running mode by the identity authentication server.

The present invention will be described in detail in combination with the accompanying drawings hereinafter.

Method Embodiments

According to the embodiments of the present invention, a method for processing an authentication of a mobile terminal is provided.

It should be noted that in order to facilitate the description, the technical solutions of the method embodiments of the present invention are described and shown in the form of steps hereinafter. The steps shown hereinafter can be performed in a computing system with, for instance, a set of instructions executable by a computer. Though the logical orders are shown in the relevant accompanying drawings, in some cases, the steps shown or described can be executed in a different order.

The embodiments of the present application and the features thereof can be combined with each other if they are not conflicted.

Figure 1:
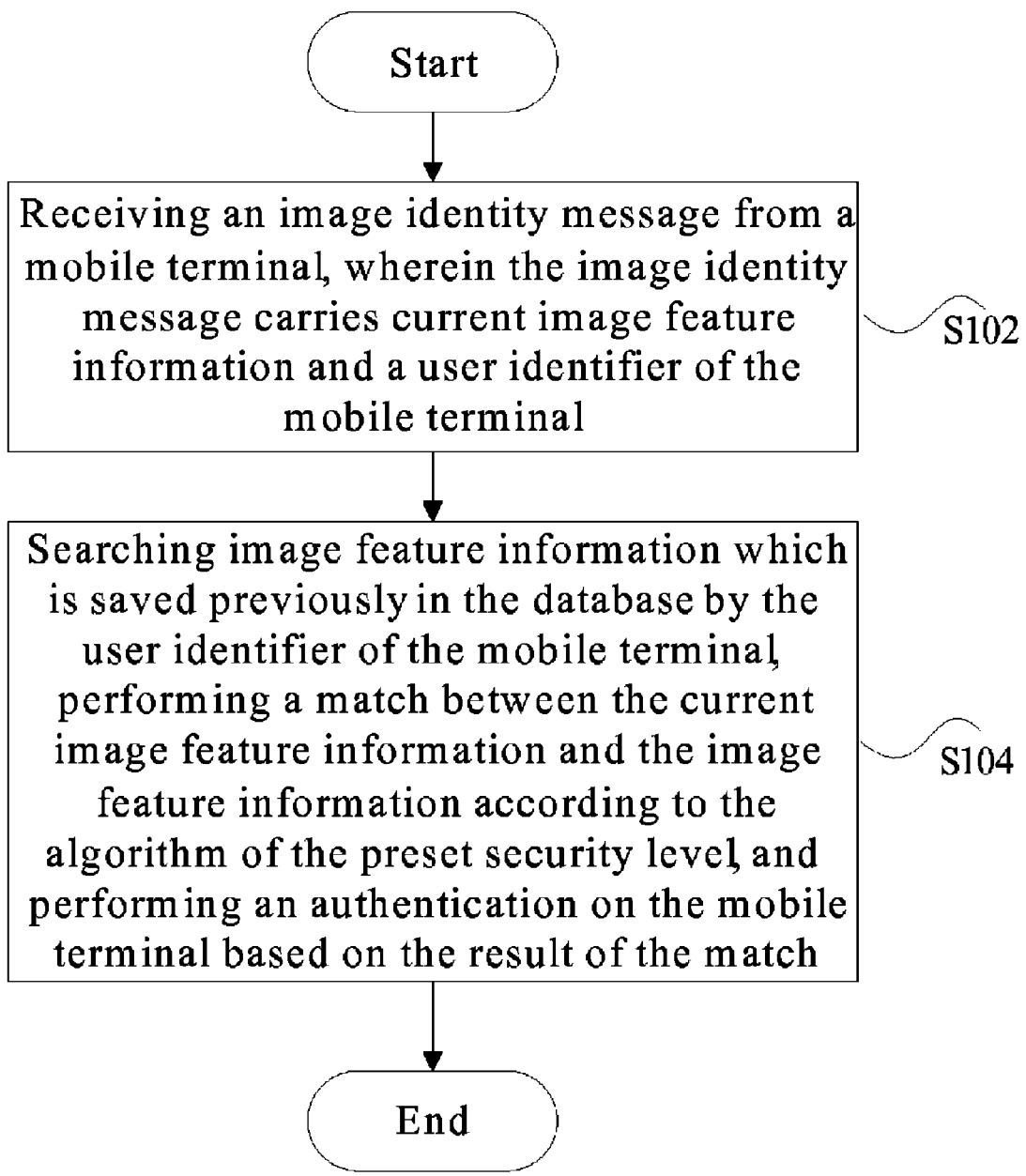
FIG. 1 is a flow diagram of a method for processing an authentication of a mobile terminal according to a method embodiment of the present invention.

FIG. 1 is a flow diagram of a method for processing an authentication of a mobile terminal according to an embodiment of the present invention. As shown in FIG. 1, the method comprises the following steps.

Step S102, a network side receives an image identity message from a mobile terminal, wherein the image identity message carries current image feature information and a user identifier of the mobile terminal.

Step S104, image feature information, that is saved previously in a database by the user identifier of the mobile terminal, is searched; a match is performed between the current image feature information and the saved image feature information according to an algorithm of the preset security level; and an authentication processing is performed on the mobile terminal based on the result of the match.

By means of the technical solutions provided by the embodiments of the present invention, the image information collected by photo shooting is used as an identity identification password, therefore, the identity authentications of different security levels can be provided, and the security and the expansibility of the identity authentication of the mobile terminal is increased greatly.

It should be noted that before implementing the embodiments of the present invention, the corresponding relations among the image feature information, the security level, and the user identifier of the terminal mobile should be set in advance at the network side for each mobile terminal; and the user identifier of the mobile terminal can include one of the following: an International mobile subscriber identity ("IMSI" for short), a PS-NUMBER, a Mobile Identification Number ("MIN" for short), etc.

In order to obtain the running mode of the mobile terminal, the mobile terminal may also carry a requested security level in the image identity message. After receiving the requested security level, the network side compares the security level requested by the mobile terminal with the security level preset by the mobile terminal. When the requested security level is lower than or equal to the preset security level, the network side authorizes to the mobile terminal a mobile terminal running mode corresponding to the requested security level; and when the requested security level is higher than the preset security level, the network side may authorize to the mobile terminal a mobile terminal running mode corresponding to the preset security level, or may return an error result to the mobile terminal.

During the specific implementation, the network side obtains an authorization result according to the result of match, wherein if the authorization result is that the mobile terminal passes the authentication or the mobile terminal fails to pass the authentication, the network side constructs an authentication and authorization data packet according to the authorization result and returns the same to the mobile terminal, the mobile terminal receives the authorization data packet returned from the network side and judges whether it passes the authentication according to the authorization data packet; wherein if it is judged as yes, the mobile terminal enters the running mode corresponding to the requested security level; and if it is judged as no or the mobile terminal fails to receive the authorization data packet in a predetermined period of time after the image identity message is sent, the mobile terminal enters the restricted mode.

The present invention is applicable to a GSM/GPRS mobile terminal having a camera function. In the method of the present invention, the mobile terminal can operate in a GSM/GPRS mobile communication network, support WAP multimedia message service(s), and support camera shooting and photographing.

Before implementing the embodiments of the present invention, the security strategies and the identity authentication data of each mobile terminal should be saved in the identity authentication database, for instance, the identity authentication data to be saved can be as shown in the following Table 1.

TABLE 1

| Field | Data Type | Attribute | Meaning |
|---|---|---|---|
| ID | Int32 | Unique | Recording an internal serial number |
| User ID | Int16 | Primary Key | User identity ID, such as IMSI number |
| Security Level | Int8 | Required | Security levels, 00H, 02H, 04H, 08H, etc. |
| Authorized Running Level | Int8 | Required | Authorized running level |
| Picture ID | Object | Required | Image identity information |
| User ID2 | Int32 | Optional | User identity ID 2, such as an identity card, a student's identity card and the like |

According to the security levels, all the applications of the mobile terminal are divided into four different security levels, and are registered into four lists which may be preloaded upon switch-on, wherein each security level corresponds to one or more applications. In addition, there are corresponding relationships between the security levels and the running modes of the mobile terminal, i.e., when the mobile terminal operates under a certain running mode, the mobile terminal can only run the applications whose security levels are under this running mode. Different security levels are also corresponding to different algorithm matches, and according to the security level preset by the mobile terminal, the network side performs different algorithm matches on the mobile terminal. For instance, the running mode of the mobile terminal can be re-defined by the system. The following Table 2 is an example.

TABLE 2

| Security Level | Match Algorithm | Running Mode (settable) corresponding to the Mobile Terminal |
|---|---|---|
| 00H | Authentication is not needed, or the authentication is failed | Restricted mode, only the shooting program, WAP-based multimedia message receiving and sending means, an emergency phone function, etc. can be switched on |
| 02H | The strongest match algorithm is used | High level running mode (full-function mode) |
| 04H | The normal match algorithm is used | Intermediate level running mode (intermediate and low level application available mode) |
| 08H | The weakest match algorithm is used | Low level running mode (low level application available mode) |

Figure 2:
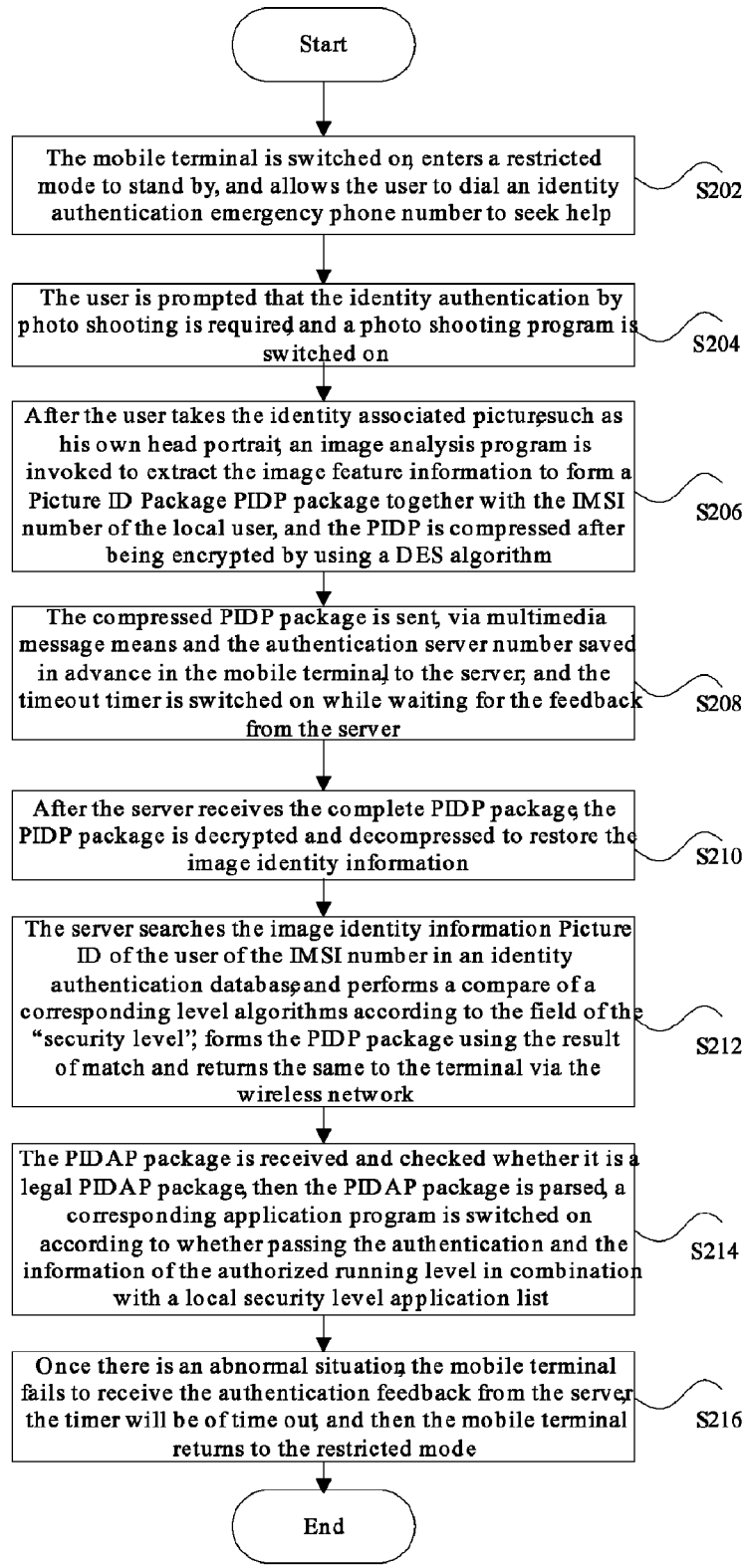
FIG. 2 is a detailed processing flow diagram of a method for processing an authentication of a mobile terminal according to a method embodiment of the present invention.

As shown in FIG. 2, for example, in the intermediate level running mode, only the application programs in the lists whose security levels are the intermediate level or the low level can be run, while the application programs in the high level list(s) can not be run.

After the security strategies and the identity authentication data of the mobile terminal are saved, the corresponding relations among the security level, image feature information and user identifier of each mobile terminal can be established.

FIG. 2 is a detailed flow diagram of a method for processing an authentication of a mobile terminal according to an embodiment of the present invention. As shown in FIG. 2, the method includes the following steps.

Step S202, the mobile terminal is switched on, enters a restricted mode to stand by, and allows the user to dial an identity authentication emergency phone number to seek help.

Step S204, the user is prompted that the identity authentication by photo shooting is required, and a photo shooting program is switched on.

Step S206, after the user takes the identity associated picture, such as his own head portrait, an image analysis program is invoked to extract the image feature information to form a Picture ID Package ("PIDP" for short) together with the IMSI number of the local user, the PIDP is compressed after being encrypted by using a DES algorithm, wherein the PIDP package can also be encrypted by using other encryption algorithms.

The mobile terminal takes the PIDP package as the core exchange data of the image identity authentication method. The format of the PIDP package can use the following definitions.

TABLE 3

| | bit | | | | | | | |
|---|---|---|---|---|---|---|---|---|
| byte | 8 | 7 | 6 | 5 | 4 | 3 | 2 | 1 |
| 1 | PIDP package identifier (7EH) | | | | | | | |
| 2-4 | The Length of the PIDP package (24 bits, the length from the next byte to the last byte) | | | | | | | |
| 5 | Protocol identifier (54H) | | | | | | | |
| 6 | PIDP package serial number ID (the front five bits are randomly generated according to the local time) | | | | | | | |
| 7 | Concatenation type or not (00H represents "no", and 01H represents "yes") | | | | | | | |
| 8 | The serial number ID of the next concatenation package (the front five bits are consistent with the current ID serial number, and the following are numbered in order) | | | | | | | |
| 9 | Receiving an application identifier (the manner in which the mobile terminal receives the verification result from the server: 04H represents the short message service, 08H represents the multimedia message service, and 12H represents each is ok) | | | | | | | |
| 10 | The type of the user ID (00H represents the IMSI number, and 01H represents the PS-NUMBER, etc. | | | | | | | |
| 11-12 | User ID, such as the IMSI number (15 bits) | | | | | | | |
| 13 | the level of the running mode requested by the mobile terminal (00H, 02H, 04H, 08H, etc.) | | | | | | | |
| 14-16 | The length of the image data (the length from the next byte to the last byte) | | | | | | | |
| 17 | Image encoding format (00H represents JEPG, 01H represents BMP, 02H represents PNG, and 03H represents GIF, etc.) | | | | | | | |
| 18 | Image data content | | | | | | | |
| | ... | | | | | | | |
| | Image data content | | | | | | | |
| End mark | 2 bytes: E0FFH | | | | | | | |

In the above, the first byte, the PIDP package identifier, is configured to indicate the current message to be the Picture ID Package; the 7$^{th}$ byte is configured to indicate whether the current PIDP package is concatenated or not, wherein if it is concatenated, the next package serial number is determined according to the 8$^{th}$ byte; otherwise, the current PIDP package is determined to be a complete information package; the 9$^{th}$ byte is configured to receive the application identifier to represent the mobile terminal can support what message services to receive the verification result from the server; the 13$^{th}$ byte is configured for the running mode requested by the mobile terminal, which represents, after passing the verification by the server, if the running mode requested by the mobile terminal is within the range authorized by the server, this mode is used preferentially. For instance, if in the mobile terminal identity verification, it passes a "full-function mode" verification and what is requested is an "intermediate and high level application available mode", the server feeds back the result of 08H, i.e., the "intermediate and high level application available mode".

Step S208, the mobile terminal sends the PIDP package to the server via the multimedia message means and the authentication server number saved in advance, and switches on the timeout timer while waiting for the feedback from the server.

Step S210, after the server receives the complete PIDP package, the PIDP package is decrypted and decompressed to restore the image identity information (corresponding to the step S102 above).

Step S212, the server searches the image identity information Picture ID of the user of the IMSI number in an identity authentication database, and performs a compare of a corresponding level algorithm according to the field of the "security level", forms the Picture ID Authorization Package ("PIDAP" for short) using the result of match and returns the same to the mobile terminal via the wireless network (corresponding to the step S104 above).

The PIDAP package is, as the result of the identity authentication of the server, returned to the mobile terminal, and the format definitions are as shown in the following Table 4.

TABLE 4

| byte | bit | | | | | | | |
|---|---|---|---|---|---|---|---|---|
| | 8 | 7 | 6 | 5 | 4 | 3 | 2 | 1 |
| 1 | PIDAP package identifier (8EH) | | | | | | | |
| 2 | The length of the PIDAP package (the length from the next byte to the last byte) | | | | | | | |
| 3 | Protocol identifier (54H) | | | | | | | |
| 4 | PIDAP package serial number ID (consistent with the front five bits of the ID of corresponding PIDP package) | | | | | | | |
| 5 | Passing the authentication or not (00 represents "not passing", 01 represents "passing" | | | | | | | |
| 6 | Authorized running mode (00H, 02H, 04H, 08H represent the above modes, respectively) | | | | | | | |
| 7-8 | End mark: E0FFH | | | | | | | |

Step S214, the mobile terminal receives the PIDAP package, checks whether it is a legal PIDAP package, then parses the PIDAP package, switches on a corresponding application program according to whether passing the authentication and the information of the authorized running level and in combination with a local security level application list, for instance, when receiving the PIDAP package, the mobile terminal checks whether the front five bits of the fourth byte serial number ID are same as the front five bits of ID of the PIDP package sent previously, wherein if not same, it represents that the package is an illegal package and will be discarded.

Step S216, once there is an abnormal situation, the mobile terminal fails to receive the PIDAP package fed back by the server, the timer will be of time out, and the mobile terminal uses the restricted mode.

The above abnormal situation may include one of the following: the wireless communication network is abnormal, for example, there is no signal or the signal is weak, etc; the abnormal PIDP package received by the server is discarded, for example, the PIDP package protocol is incorrect, or the concatenation is incomplete; the load of the server is too large, and the PIDP package returning is overtime; the mobile terminal fails to receive the PIDP or receiving an illegal PIDAP package, for example, the front five bits of the serial number are inconsistent with that of the PIDP package.

The steps shown in FIG. 2 can be performed in a computer system with, for instance, a set of instructions executable by a computer. Though the logical orders are shown in FIG. 2, in some circumstances, the steps shown or described herein can be executed in a different order.

Apparatus Embodiments

According to the embodiments of the present invention, an apparatus for processing an authentication of a mobile terminal is provided.

Figure 3:
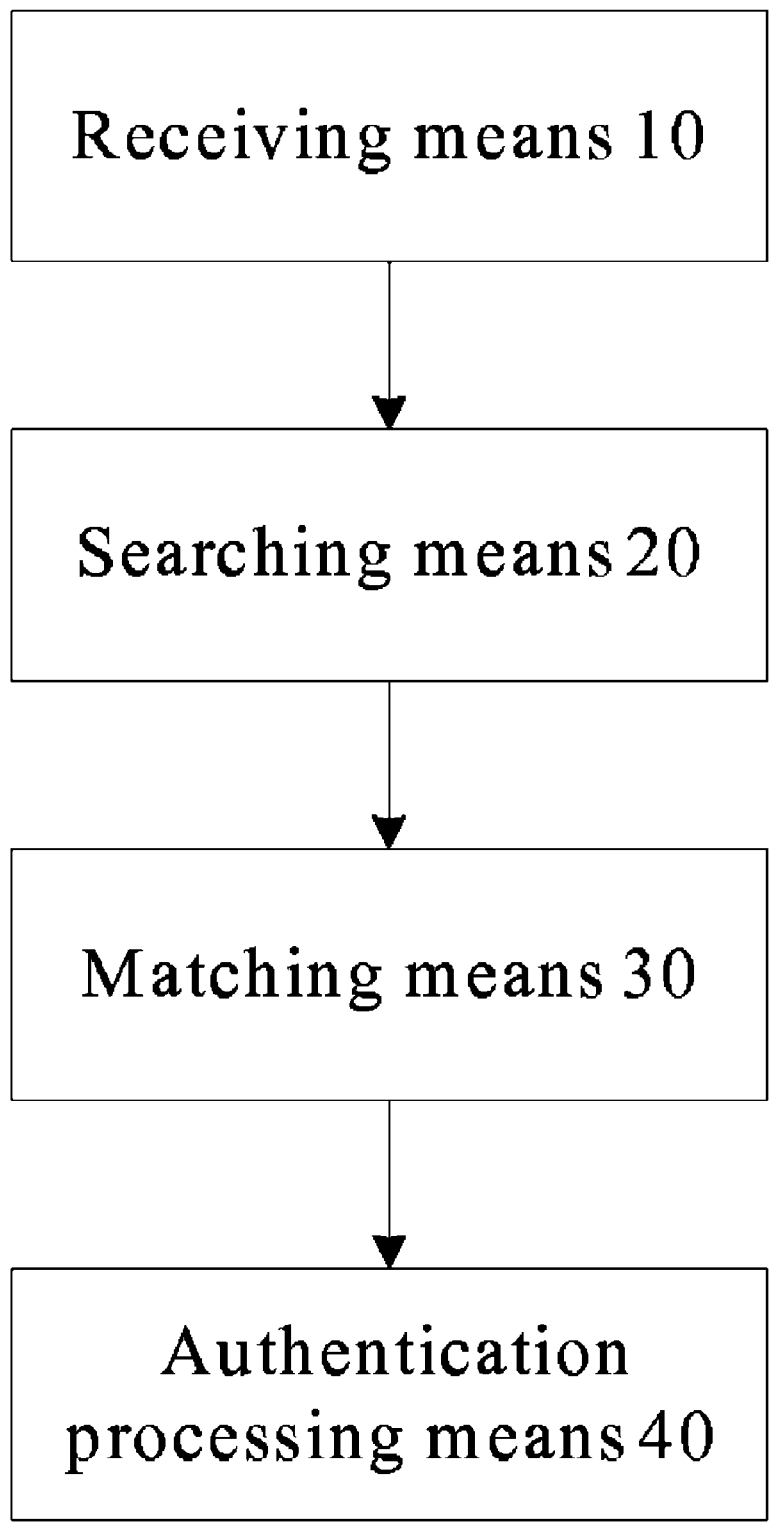
FIG. 3 is a structural block diagram of an apparatus for processing an authentication of a mobile terminal according to an apparatus embodiment of the present invention.

FIG. 3 is a structural block diagram of an apparatus for processing an authentication of a mobile terminal according to an embodiment of the present invention. As shown in FIG. 3, the apparatus comprises receiving means 10, searching means 20, matching means 30 and authentication processing means 40.

The receiving means 10 is configured to receive an image identity message from the mobile terminal, wherein the image identity message carries current image feature information and a user identifier of the mobile terminal; the searching means 20, connected to the receiving means 10 and configured to search the image feature information which is saved previously in a database by the user identifier of the mobile terminal; the matching means 30, connected to the searching means 20, and configured to perform a corresponding algorithm match between the current image feature information and the image feature information according to a preset security level; and the authentication processing means 40, connected to the matching means 30, and configured to perform an authentication processing on the mobile terminal based on the result of the match determined by the algorithm match.

Figure 4:
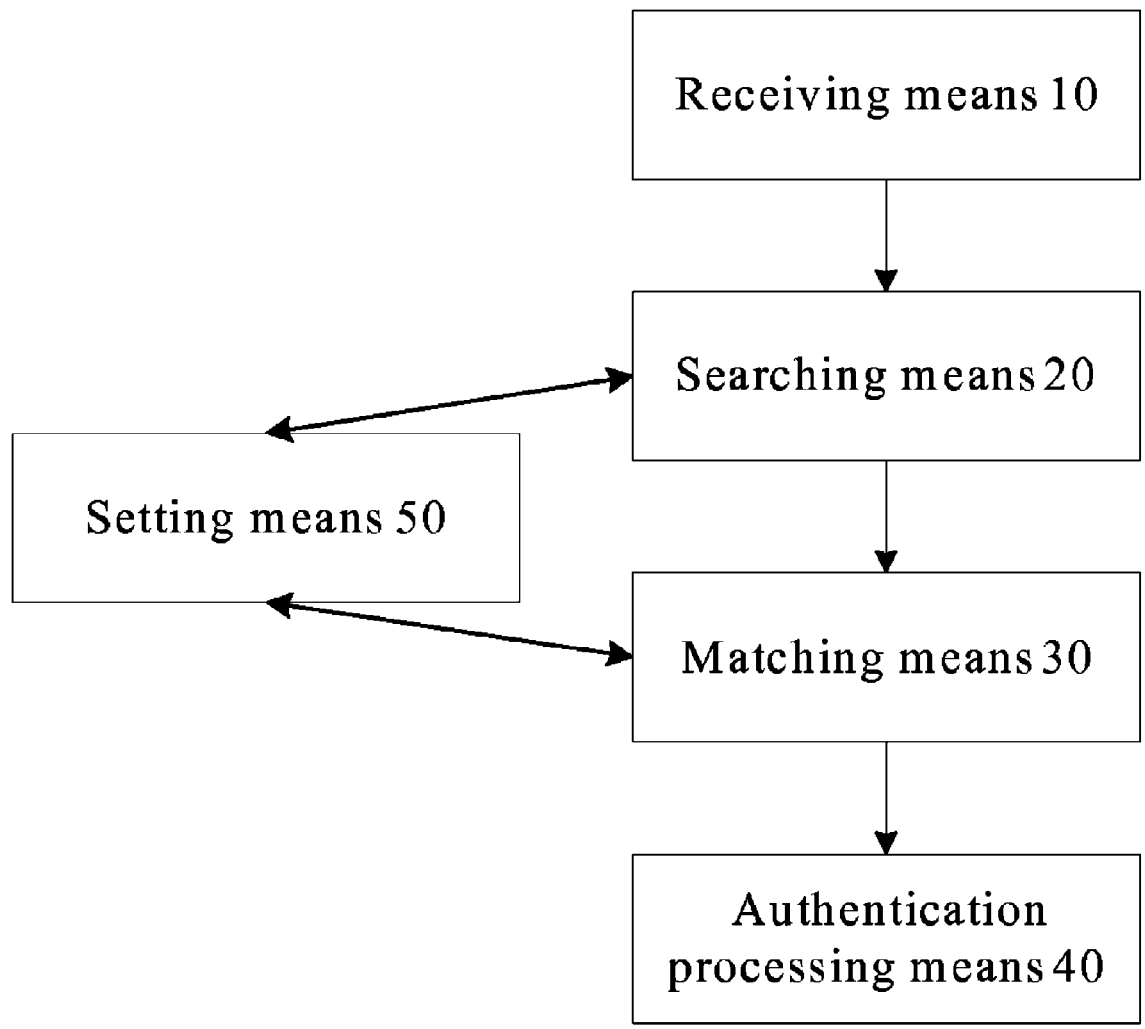
FIG. 4 is a preferably structural block diagram of an apparatus for processing an authentication of a mobile terminal according to an apparatus embodiment of the present invention.

FIG. 4 is a preferable structural block diagram of the apparatus for processing the authentication of the mobile terminal according to the embodiment of the present invention. As shown in FIG. 4, on the basis of the apparatus shown in FIG. 3, the apparatus can also comprise a setting means 50. The setting means 50, connected to the searching means 20 and the matching means 30, is configured to set the corresponding relations among image feature information, the security level and the user identifier of each mobile terminal.

By means of the apparatus for processing the authentication of the mobile terminal provided by the embodiments of the present invention, the image information collected by the camera is used as an identity identification password, therefore, the identity authentications of different security levels can be provided and the security and expansibility of the identity authentication of the mobile terminal is increased greatly.

Figure 5:
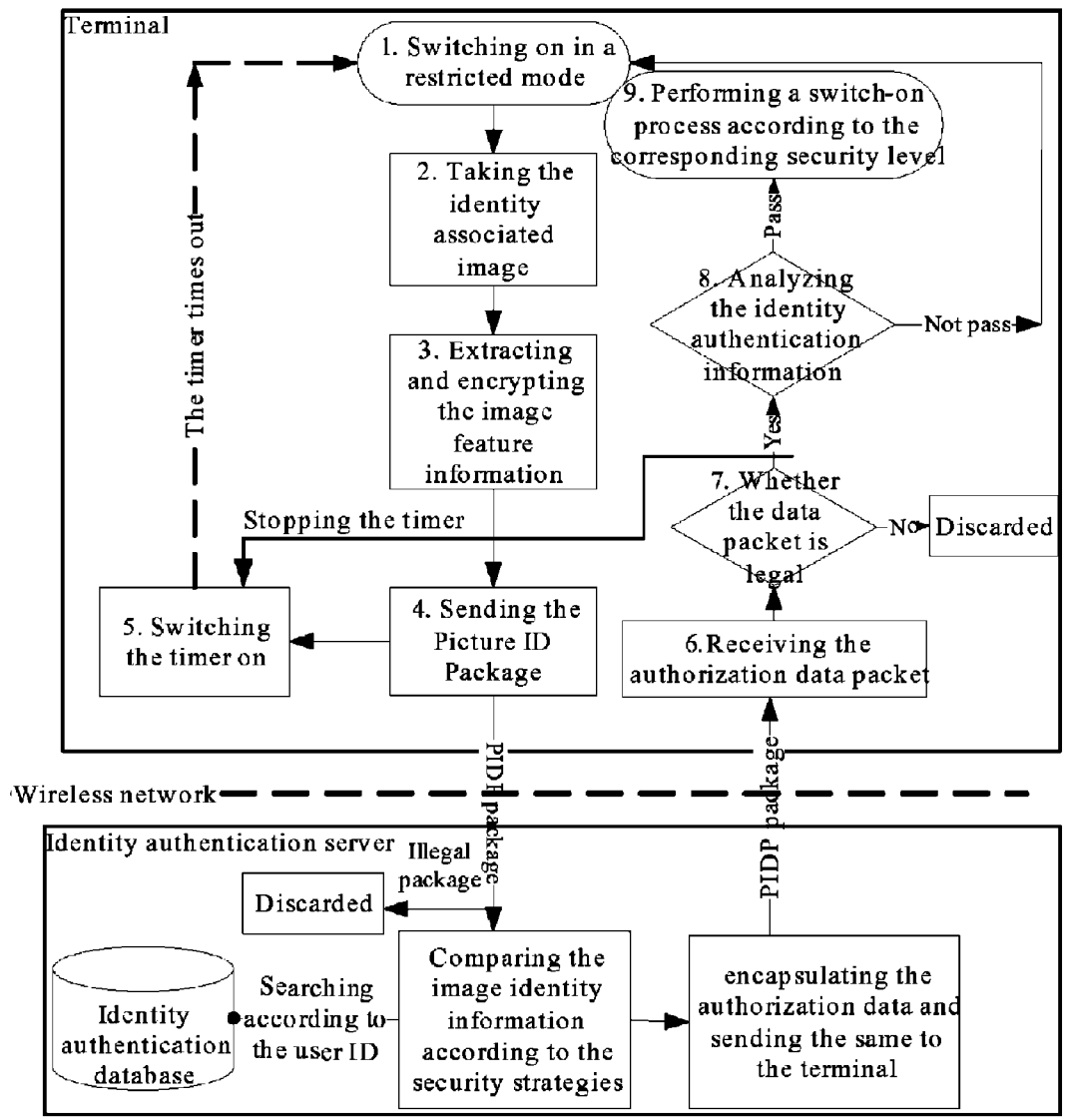
FIG. 5 is a schematic diagram of a method for processing an authentication of a mobile terminal according to a method embodiment of the present invention.

FIG. 5 is a schematic diagram of a method for processing an authentication of a mobile terminal according to embodiment of the present invention. The identity authentication server shown in FIG. 5 can be the apparatus for processing the authentication of the mobile terminal shown in FIG. 3 or FIG. 4, and the technical solution shown in FIG. 1 can be performed by this identity authentication server. As shown in FIG. 5, during the authentication processing, the terminal performs the following processes in turn: switching on in a restricted mode, taking the identity associated image, extracting and encrypting the image feature information, switching on the timer while sending the Picture ID Package to the identity authentication server. The identity authentication server compares the image identity information according to the security strategies, encapsulates the authorization data and sends it to the terminal, the terminal receives the authorization data packet and judges whether the authorization data packet is legal or not, wherein if it is legal, the identity authentication information is analyzed, and the switch-on process is performed according to the corresponding security level; otherwise, the authorization data packet is discarded, and the user terminal remains in the restricted mode.

As described in the above, by means of the method and/or the apparatus for processing the authentication of the mobile terminal provided by the present invention, the image information collected by photo shooting is used as an identity identification password, therefore, the identity authentications of different security levels can be provided and the security and expansibility of the identity authentication of the mobile terminal is increased greatly; moreover, an individualized switch-on process is provided for the user.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A method for processing an authentication of a mobile terminal, comprising:

receiving an image identity message from a mobile terminal, wherein the image identity message carries current image feature information and a user identifier of the mobile terminal; and searching image feature information which is saved previously in a database by the user identifier of the mobile terminal, performing a corresponding algorithm match between the current image feature information and the image feature information according to a preset security level, and performing an authentication on the mobile terminal based on the result of the match, wherein the image identity message further comprises a security level requested by the mobile terminal; and the method further comprises: comparing the security level requested by the mobile terminal with the security level preset by the mobile terminal; and authorizing to the mobile terminal a running mode of the mobile terminal corresponding to the security level requested in the case that the security level requested is lower than or equal to the preset security level.

2. The method according to claim 1, wherein before receiving the image identity message from the mobile terminal, the method further comprises:

for each mobile terminal, presetting corresponding relations among the user identifier, the image feature information and the security level thereof.

3. The method according to claim 2, wherein the user identifier of the mobile terminal comprises one of the following: an international mobile subscriber identity, a PS-NUMBER, and a Mobile Identification Number.

4. The method according to claim 1, wherein before receiving the image identity message from the mobile terminal, the method further comprises: the mobile terminal obtaining an image by an image shooting device thereon, and obtaining the current image feature information according to the image.

5. The method according to claim 4, wherein the user identifier of the mobile terminal comprises one of the following: an international mobile subscriber identity, a PS-NUMBER, and a Mobile Identification Number.

6. The method according to claim 1, wherein an operation of performing the authentication on the mobile terminal according to the result of the match comprises:

obtaining an authorization result according to the result of the match, wherein the authorization result comprises the mobile terminal passing the authentication or the mobile terminal failing to pass the authentication; and configuring an authentication and authorization data packet according to the authorization result, and returning the same to the mobile terminal.

7. The method according to claim 6, wherein the method further comprises:

the mobile terminal receiving authorization data packet, and judging whether it passes the authentication according to authorization data packet;

wherein if the result of the judgment is pass, the mobile terminal enters a running mode corresponding to the security level requested; and if the result of the judgment is fail or the mobile terminal fails to receive authorization data packet in a predetermined period of time after sending the image identity message, the mobile terminal enters a restricted mode.

8. The method according to claim 7, wherein the user identifier of the mobile terminal comprises one of the following: an international mobile subscriber identity, a PS-NUMBER, and a Mobile Identification Number.

9. The method according to claim 6, wherein the user identifier of the mobile terminal comprises one of the following: an international mobile subscriber identity, a PS-NUMBER, and a Mobile Identification Number.

10. The method according to claim 1, wherein the user identifier of the mobile terminal comprises one of the following: an international mobile subscriber identity, a PS-NUMBER, and a Mobile Identification Number.

11. An apparatus for processing an authentication of a mobile terminal, comprising:

receiving means, configured to receive an image identity message from a mobile terminal, wherein the image identity message carries current image feature information and a user identifier of the mobile terminal;

searching means, configured to search image feature information which is saved previously in a database by the user identifier of the mobile terminal;

matching means, configured to perform a corresponding algorithm match between the current image feature information and the image feature information according to a preset security level; and authentication processing means, configured to perform an authentication on the mobile terminal based on a result of the match determined by the algorithm match, wherein the image identity message further comprises a security level requested by the mobile terminal; and the apparatus performing the following functions: comparing the security level requested by the mobile terminal with the security level preset by the mobile terminal; and authorizing to the mobile terminal a running mode of the mobile terminal corresponding to the security level requested in the case that the security level requested is lower than or equal to the preset security level.

12. The apparatus according to claim 11, wherein the apparatus further comprises:

setting means, configured to set corresponding relations among the user identifier, the image feature information and the security level of each mobile terminal.

* * * * *